Figure 1:
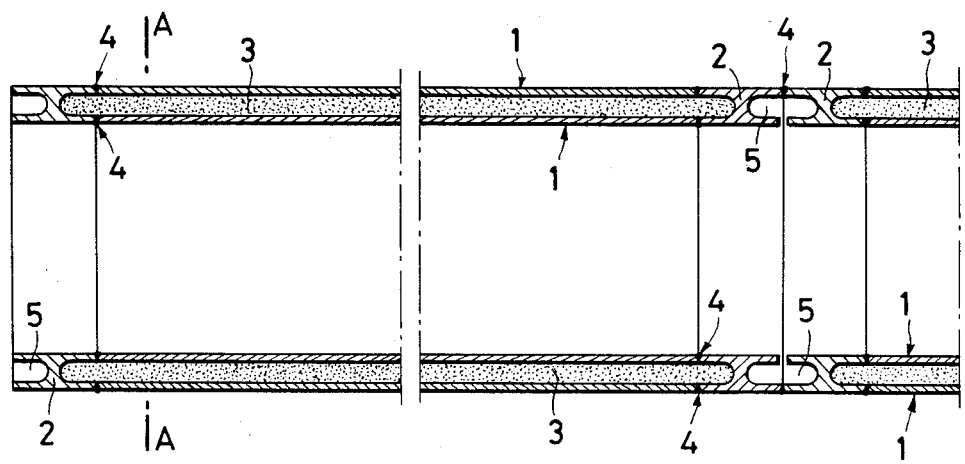

United States Patent [19]

Berti et al.

[11] Patent Number: 4,560,188

[45] Date of Patent: Dec. 24, 1985

[54] THERMALLY INSULATED PIPE FOR THE CONSTRUCTION OF UNDERWATER PIPELINES

[75] Inventors: Alfredo Berti; Werther Mussati, both of Fano; Roberto Bruschi, S.Donato Milanese, all of Italy

[73] Assignee: Snamprogetti S.p.A., Milan, Italy

[21] Appl. No.: 485,437

[22] Filed: Apr. 15, 1983

[30] Foreign Application Priority Data

Apr. 20, 1982 [IT] Italy .............................. 20821 A/82

[51] Int. Cl.⁴ ............................................ F16L 59/14
[52] U.S. Cl. ........................................ 285/47; 285/48
[58] Field of Search ............................ 285/47, 48, 50; 405/157, 171; 138/149, 155

[56] References Cited

U.S. PATENT DOCUMENTS

| 701,209 | 5/1902 | Luke | 285/47 X |
| 2,419,278 | 4/1947 | Motsenbocker | 285/47 X |
| 3,559,660 | 2/1971 | Rollins | 138/149 |
| 3,650,299 | 3/1972 | Seiler et al. | 138/149 |
| 4,130,301 | 12/1978 | Dunham | 138/149 X |

FOREIGN PATENT DOCUMENTS

| 0125661 | 11/1978 | Japan | 285/47 |
| 0115467 | 9/1979 | Japan | 285/47 |

Primary Examiner—Richard J. Scanlan, Jr.
Attorney, Agent, or Firm—Hedman, Gibson, Costigan & Hoare

[57] ABSTRACT

The present invention relates to a thermally insulated pipe for the construction of underwater pipelines, characterized by being formed from prefabricated pipe portions welded together, each portion being constituted by two concentric tubes of different diameter which are connected together at their ends by means of special cylindrical pieces having a double T section which are welded to the two tubes in such a manner as to form between them an annular interspace which is filled with thermally insulating material.

3 Claims, 2 Drawing Figures

THERMALLY INSULATED PIPE FOR THE CONSTRUCTION OF UNDERWATER PIPELINES

This invention relates to a thermally insulated pipe constructed in such a manner that the insulating material which covers it is protected against any damage deriving from external agents or from the handling of the pipe itself. In particular, the present invention relates to a thermally insulated pipe for the construction of underwater pipelines. Underwater pipelines have sometimes to be covered with thermally insulating material in order to reduce the heat transfer which takes place between the conveyed fluid and the external environment. This is done for example when conveying crude petroleum of high freezing point, which has to be kept at a temperature exceeding ambient temperature, and when conveying liquefied gases which have to be kept at a temperature lower than ambient temperature. In the known art, the pipes are covered with thermally insulating material, on which, if necessary, there is superposed a layer of concrete for the purpose of increasing the weight of the pipeline and facilitating its sinking and its stability on the sea bed. However, the known art has the following drawbacks when the pipe is not covered with concrete;

(a) The insulating material is subject to accidental damage. In particular, the laying of such pipes by means of a pipe laying ship is extremely critical. In this respect, during the laying operation, the pipe is gripped between the jaws of special apparatus known as tensioners, and this gripping can damage the insulating covering.

(b) The insulating covering is particularly exposed to water infiltration which drastically reduces its efficiency.

(c) In the case of pipelines for great depths, the presure of the surrounding water can reach levels which are sufficient to squash the insulating covering, so destroying the pores which constitute the barrier to heat passage, thus making its use ineffective.

If the pipe is to be covered with a layer of concrete, the underlying thermal insulation must be made of a fairly rigid insulating material in order to support the weight of the concrete. For example, light materials of low heat transfer coefficient and high insulating power such as rock wool, foam etc. cannot be used.

Furthermore, the concrete layer is rather fragile and usually breaks during the pipe handling during laying.

The pipe according to the present invention obviates the aforesaid drawbacks. In this respect, it is formed by joining together pipe portions, each of which is constituted by two concentric tubes of different diameter which are connected together at their ends by special cylindrical pieces of double T section, which are welded to the two tubes in such a manner as to form a water-tight annular cavity which is filled with the insulating material.

Figure 2:
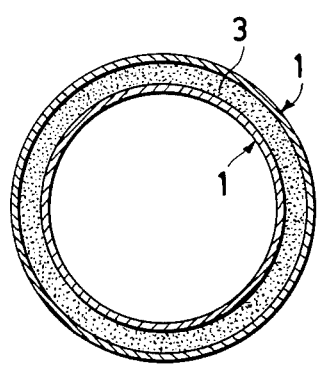

FIG. 1 is a longitudinal section through the pipe according to the present invention, and FIG. 2 is a cross-section therethrough on the line AA.

The invention is described hereinafter with reference to the aforesaid Figures.

FIG. 1 shows a pipe portion formed from two concentric tubes 1 connected together at their ends by cylindrical pieces 2 of double T section, in such a manner as to form an annular interspace 3 which is filled with the thermally insulating material.

The interspace 3 can be filled by covering the tube of smaller diameter with the thermally insulating material before inserting it into the tube of greater diameter and before connecting together the two concentric tubes by means of the cylindrical pieces 2.

Alternatively, the filling can be effected after the two tubes have been connected together at their ends by means of the cylindrical pieces 2, by injecting special resins able to form thermally insulating foams into the interspace 3 through suitable holes, said holes then being sealed.

The pipeline is constructed by connecting together by means of welds 4 the pipe portions formed by the aforesaid method.

The particular form of the end pieces 2 generates new cavities 5 which are filled with the conveyed fluid.

The pipe constructed in the aforesaid manner attains the following advantages.

The insulating material is encapsulated in the interspace between the two tubes, and is therefore protected from any damage deriving from the handling necessary for laying the pipe, and is also protected from water infiltration and the effects of the external pressure. Furthermore, the actual operation of covering the pipe with thermally isulating material is more simple and economical, in addition to the fact that insulating material can be used which is lighter and has a low heat transfer coefficient. As it does not come into contact with external agents, the insulating power of the insulating material remains constant with time.

The thermally insulated pipe portions can be constructed in a works which is remote from their place of use, and no special precautions are required either for their transportation or for their joining together.

The special configuration of the end pieces enables any discontinuity in the inner diameter of the pipe to be prevented. This is particularly important both in preventing any disadvantageous obstacle to the flow of the fluid, and in allowing the passage of special equipment which may sometimes be slid along the interior of the pipeline. The greater weight of the pipe per meter often makes its covering with concrete superfluous. However, when it is necessary to increase the weight of the pipe by means of concrete, said covering is more stable.

We claim:

1. A thermally insulated prefabricated pipe for the construction of underwater pipelines, comprising
    an outer tube,
    an inner tube concentric to and spaced from said outer tube thereby forming an annulus between said outer tube and said inner tube,
    a cylindrical double Tee end section welded to said outer tube end and said inner tube end thereby sealing said annulus; and
    a thermally insulating material contained within said annulus.

2. The thermally insulated pipe of claim 1, wherein said annulus is filled with said thermally insulating material by covering said inner tube with said thermally insulating material before inserting said inner tube into said outer tube.

3. The thermally insulated pipe of claim 1, wherein said annulus is filled with said thermally insulating material by injecting an insulating foam forming resin into said annulus through a plurality of fill holes after said double Tee end section is welded to said outer and inner tubes, said fill holes then being sealed.

* * * * *